(12) United States Patent
Ebeid et al.

(10) Patent No.: US 8,948,694 B2
(45) Date of Patent: Feb. 3, 2015

(54) ANTENNA SHIELD FOR PROXIMITY-BASED COMMUNICATION DEVICES

(71) Applicants: Research In Motion Limited, Waterloo (CA); Certicom Corp., Mississauga (CA)

(72) Inventors: Nevine Maurice Nassif Ebeid, Kitchener (CA); Yevgeny Bondar, Richmond Hill (CA); Shirook M. Ali, Milton (CA)

(73) Assignees: Blackberry Limited, Waterloo (CA); Certicom Corp., Mississauga (CA)

( * ) Notice: Subject to any disclaimer, the term of this patent is extended or adjusted under 35 U.S.C. 154(b) by 113 days.

(21) Appl. No.: 13/693,566

(22) Filed: Dec. 4, 2012

(65) Prior Publication Data

US 2014/0152417 A1     Jun. 5, 2014

(51) Int. Cl.
*H04B 5/00*     (2006.01)
*H01F 38/14*    (2006.01)

(52) U.S. Cl.
CPC ..................... *H01F 38/14* (2013.01)
USPC .......................... 455/41.1; 340/10.1; 343/878

(58) Field of Classification Search
USPC ............... 340/10.1, 10.5, 5.6, 5.61, 572.7; 455/41.1; 726/26; 343/872, 878, 893
See application file for complete search history.

(56) References Cited

U.S. PATENT DOCUMENTS

| | | | |
|---|---|---|---|
| 2006/0017570 A1 | 1/2006 | Moskowitz et al. | |
| 2007/0008140 A1* | 1/2007 | Saarisalo et al. | 340/572.7 |
| 2007/0289775 A1 | 12/2007 | Potts et al. | |
| 2008/0284606 A1 | 11/2008 | Liu et al. | |
| 2008/0303632 A1 | 12/2008 | Hammad | |
| 2012/0047631 A1 | 3/2012 | Connolly | |
| 2012/0135681 A1* | 5/2012 | Adams et al. | 455/41.1 |

FOREIGN PATENT DOCUMENTS

| | | |
|---|---|---|
| EP | 2139196 A1 | 12/2009 |
| WO | WO 2012/013054 A1 | 2/2012 |

OTHER PUBLICATIONS

Lindberg, P.; Search Report from corresponding European Application No. 12195450.7; search completed May 29, 2013.
Francis, L. et al.; "Practical Relay Attack on Contactless Transactions by Using NFC Mobile Phones"; Dec. 23, 2011; IACR; http://eprint.iacr.org/2011/618.pdf.
Heydt-Benjamin, T. et al.: "Vulnerabilities in First-Generation RFID-enabled Credit Cards"; FC'07/USEC'07 Proceedings of the 11th International Conference on Financial cryptography and 1st International conference on Usable Security; 2007; pp. 2 to 14; LNCS 4886; Springer-Verlag.
Gresham, J.; "Making the case for an NFC-enabled iPhone 5"; Aug. 27, 2012; http://www.idownloadblog.com/2012/08/27/iphone5-nfc-speculation/.
iCarte™—the Ultimate NFC/RFID Reader for iPhone®; accessed online Nov. 1, 2012; http://www.icarte.ca/features11-.shtml.

* cited by examiner

*Primary Examiner* — Thomas Mullen
(74) *Attorney, Agent, or Firm* — Brett J. Slaney; Blake, Cassels & Graydon LLP (57) ABSTRACT

A shielding article is provided, for shielding a device enabled for proximity-based communications, for example, NFC-enabled devices. The shielding article comprises a shielding component configured to prevent operation of an antenna of the device used for conducting proximity-based communications, without preventing operation of at least one other antenna of the device when the shielding component is aligned with the antenna used for conducting proximity-based communications. The shielding article may be separate from, or included in an accessory or carrying article and may be fixed or detachably coupled thereto.

24 Claims, 6 Drawing Sheets

ANTENNA SHIELD FOR PROXIMITY-BASED COMMUNICATION DEVICES

TECHNICAL FIELD

The following relates to antenna shields for proximity-based communication devices, for example, near field communication (NFC) enabled devices.

DESCRIPTION OF THE RELATED ART

Electronic devices may be enabled with short-range or proximity-based communication capabilities, for example, NFC capabilities. NFC enables devices to establish radio communication with each other by touching or tapping the devices together, or by bringing such devices into close proximity, typically within a few centimeters. NFC applications include, without limitation, contactless transactions, data exchanges, provisioning or set-up operations, etc. Communication is also possible between a powered NFC-enabled device and an unpowered NFC chip, often referred to as a "tag". NFC builds upon radio frequency identification (RFID) systems by allowing two-way communication between endpoints, whereas earlier contactless systems, e.g., using contactless "smart" cards provided one-way communication capabilities. Unpowered NFC tags may be used to provide such one-way applications.

NFC-enabled devices can be configured to support a "card emulation mode" in which the device is used in place of a credit card, bank card, access control card/badge, loyalty card, transportation ticket, etc. It is typically desirable to have a card emulation mode operable even when the NFC-enabled device is turned off or when the device is out of battery life to allow the NFC capabilities to be used independent of the other features provided by the device, e.g., data communications, cellular telephony access, etc. Examples of NFC-enabled devices include, without limitation, smart phones, tablet computers, laptop computers, handset devices, cards, etc.

A drawback of allowing NFC capabilities when the NFC-enabled device is turned off is that software controls employed to protect the device from attacks (e.g., relay attacks) are rendered inoperable. For example, NFC card emulation can be disabled when a backlight for a device screen is turned off, and notifications such as sound and vibration can also be enabled to alert the user when NFC capabilities are being used. However, these mechanisms are only effective to detect and/or prevent an attack on the NFC-enabled device when the device is turned on and these mechanisms are active.

BRIEF DESCRIPTION OF THE DRAWINGS

Embodiments will now be described by way of example only with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been recognized that when a proximity-based communication device such as an NFC-enabled device is turned off, and a card emulation mode is enabled, countermeasures are still required to protect the device, in the same way a credit card, access control card, transportation ticket, or other non-interactive proximity-based communication item or component would require protection. To provide countermeasures to attacks when a proximity-based communication device is turned off, but continues to be capable of operating in a card emulation mode, it has been found that an article configured to be coupled with or otherwise adjacent to the device can be adapted to include a shielding component to prevent operation of or otherwise obstruct an antenna used to conduct the communications, without obstructing at least one other antenna of the proximity-based communication device (e.g., cellular or WiFi antenna). For example, an article that is adapted to contain, hold, support, protect, carry, or otherwise fit with the proximity-based communication device, such as an accessory, holster, carrying article (e.g., bag, purse, luggage, etc.), cradle, cover, etc.; may be configured to include a particular amount of the shielding component in a particular location of the article.

Additionally, it has been found that by placing or positioning the shielding material such that it aligns with the proximity-based communication antenna without obstructing or preventing operation of other antennae, shielding can also be provided while proximity-based communication device is on without shielding such other antennae, e.g., to enable networks such as cellular, WiFi, Bluetooth, etc. to be accessed. The shielding article may also be movable with respect to the communication-enabled device to enable the article to be aligned with the proximity-based communication antenna in a first position to obstruct proximity-based communications and to be moved to at least one second position to remove the obstruction and thus permit proximity-based communications. For example, a flap, closure, sleeve or other article that is integrated into or sized to fit with the enabled device or an accessory for the enabled device can be configured to include the shielding component. In this way, a multi-mode article can be provided that enables both relay attack countermeasures to be applied and such countermeasures to be inhibited when normal operations are desired.

It has been recognized that protection can be provided to a proximity-based communication-enabled device, despite software measures that normally protect the enabled device from attacks being disabled when the power is turned off. For example, when an NFC-enabled device is on, a software control may disable a card emulation mode when a backlight for a display screen is off. Similarly, notification and alerts can also be enabled to signify when NFC is being used. However, such measures will not necessarily be operable when the device is turned off. The shielding article herein described provides a countermeasure to disable proximity-based communications when it is not desirable for the enabled device to provide a card emulation mode, even when the enabled device is turned off.

In the following examples, devices utilizing NFC technology are illustrated. However, it can be appreciated that the principles discussed herein equally apply to any short-range, near-field, or proximity-based communication technologies, collectively referred to above as "proximity-based" communications.

Figure 1:
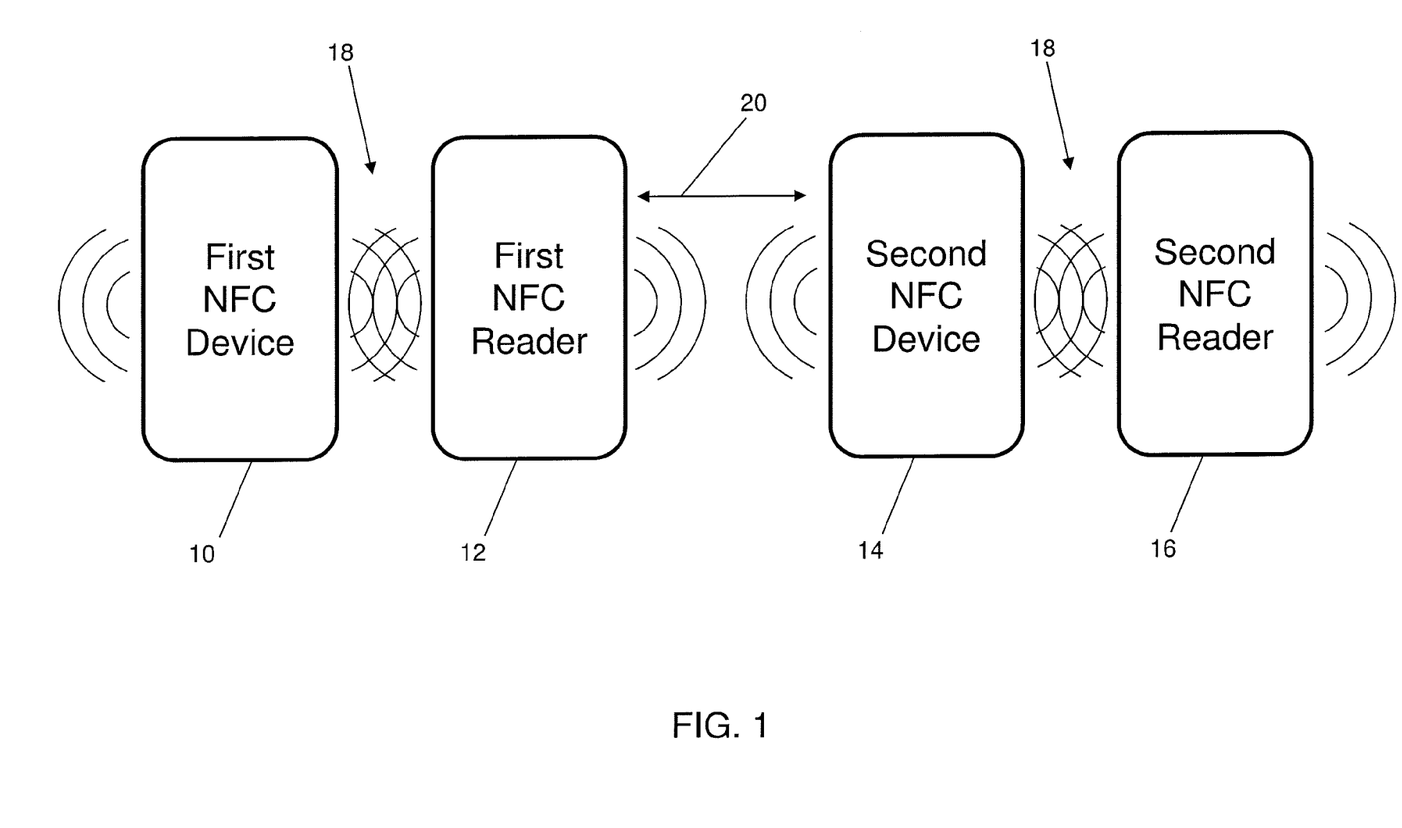
FIG. 1 is a schematic diagram illustrating an arrangement of devices capable of performing a relay attack on an NFC-enabled device.

FIG. 1 illustrates an example of a relay attack on a first NFC device 10 that is positioned to participate in an NFC communication 18 with a first NFC reader 12, which in this example is used by an attacker as a proxy. In the example shown in FIG. 1, the attacker possessing a second NFC device 14 may connect to the first NFC reader 12 over a communication channel 20, e.g., Bluetooth, WiFi, cellular, etc. The second NFC device 14 may be a smart phone or other mobile computing device having an NFC card emulation mode that is capable of both conducting an NFC transaction with a second NFC reader 16 (e.g., a merchant terminal) and communicating with the first NFC reader 12. Such an arrangement has been demonstrated in the following paper: "Lishoy Francis, Gerhard Hancke, Keith Mayes, Konstantinos Markantonakis, *Practical Relay Attack on Contactless Transactions by Using NFC Mobile Phones*, Cryptology ePrint Archive: Report 2011/618 (online at http://eprint.iacr.org/2011/618)". When the second NFC device 14 is in proximity of the second NFC reader 16, an NFC transaction begins. The challenge presented by the second NFC reader 16 is relayed by the second NFC device 14 to the first NFC reader 12 acting as a proxy, which in turn relays the challenge to the first NFC device 10. The first NFC device 10 would correctly provide a response to the challenge as if it were in proximity of the second NFC reader 16, which can be assumed to be a legitimate reader at, for example, a merchant location, kiosk, etc. The response is relayed by the first NFC reader 12 back to the second NFC device 14, and the transaction with the legitimate second NFC reader 16 can be completed successfully. In this way, the attacker possessing the second NFC device 14 is granted a privilege that was intended to be provided to the holder of the first NFC device 10, e.g., access to a physical location, access to a credential, access to personal information, etc.

In cases where the first NFC device 10 is an NFC chip or an NFC-enabled device such as a smart phone or other computing device, a card emulation mode may be provided that is susceptible to the above-described attack. For powered devices, this may be true even when the device is turned off. To protect against such a scenario, the following describes a shielding article that includes a shielding component to obstruct an NFC antenna of an NFC-enabled device. Additionally, the shielding article may be capable of obstructing the NFC antenna without obstructing one or more of the other antennae of the NFC-enabled device, to allow for NFC to be disabled when the NFC-enabled device is still on. Furthermore, the shielding article may be configured to permit the shielding component to be movable thus allowing both NFC operable and NFC inoperable modes or states.

Figure 2:
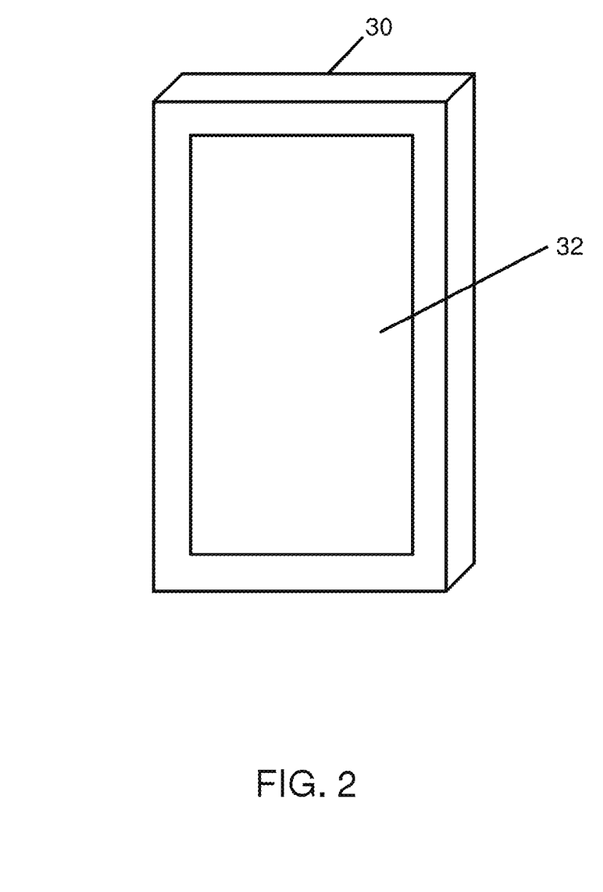
FIG. 2 is a front perspective view of a mobile device.
Figure 3:
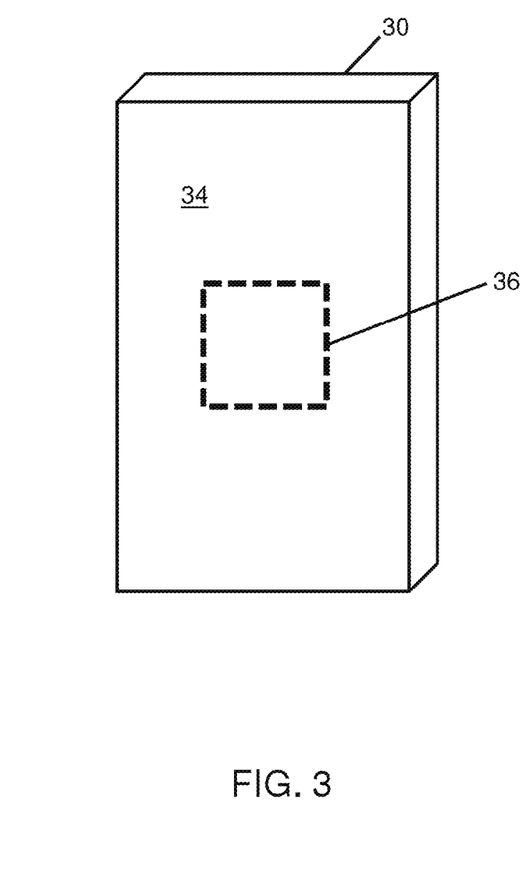
FIG. 3 is a rear perspective view of a mobile device.

FIGS. 2 and 3 illustrate an example of a mobile device 30 having a display screen 32. It can be appreciated that the mobile device 30 shown herein is for illustrative purposes only and that the principles described herein are applicable to any NFC-enabled device, including both powered (active) and non-powered (passive) NFC-enabled devices. FIG. 3 illustrates a rear surface 34 of the mobile device 30. In this example, it is assumed that an NFC antenna 36, visible in FIG. 3 as dashed lines for illustrative purposes, is contained in the mobile device 30 such that an NFC transaction can be conducted by tapping, touching or being in proximity of the rear surface 34. For example, the NFC antenna 36 may be placed behind or under a battery "back door" of the mobile device 30. It can be appreciated that the NFC antenna 36 may be positioned in different locations and the placement shown in FIG. 3 is for illustrative purposes only. For example, the placement of the NFC antenna 36 may be dictated by the size of the device, the configuration of the electronics, and the placement of other antennae so as to minimize interference. Also, the NFC antenna 36 may lie in multiple planes relative to the device. For example, the NFC antenna 36 may wrap around the bottom of a mobile device 30 thus being accessible from both the front and rear surfaces of the mobile device 36. In such scenarios, it can be appreciated that the shielding as herein described would be adapted to align with the NFC antenna 36 on multiple planes and surfaces.

Figure 4:
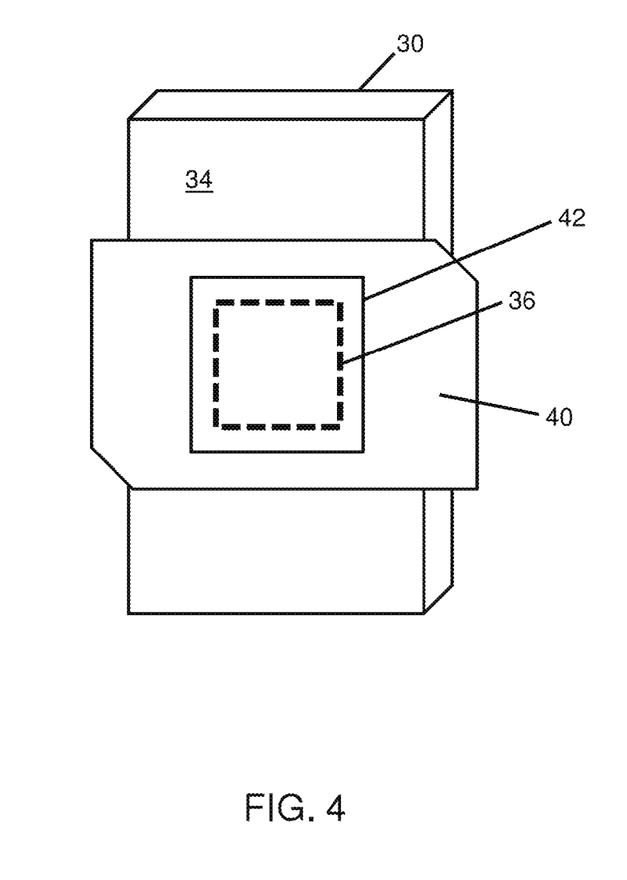
FIG. 4 is a perspective view of a mobile device coupled to a shielding article for shielding an NFC antenna.

FIG. 4 illustrates at least a portion of a shielding article 40 which, as shown in FIG. 4 is configured to be coupled or otherwise interact with a portion of the mobile device 30 in order to align a shielding component 42 with the NFC antenna 36. It can be appreciated that although the shielding article 40 and shielding component 42 are illustrated as separate elements, such a distinction is for illustrative purposes only. For example, the shielding article 40 may be comprised entirely of the shielding component 42 and thus the shielding article 40 and shielding component 42 may be one and the same. In other words, the shielding article 40 may either include or support the shielding component 42 or otherwise exhibit the properties of the shielding component 42.

Figure 5:
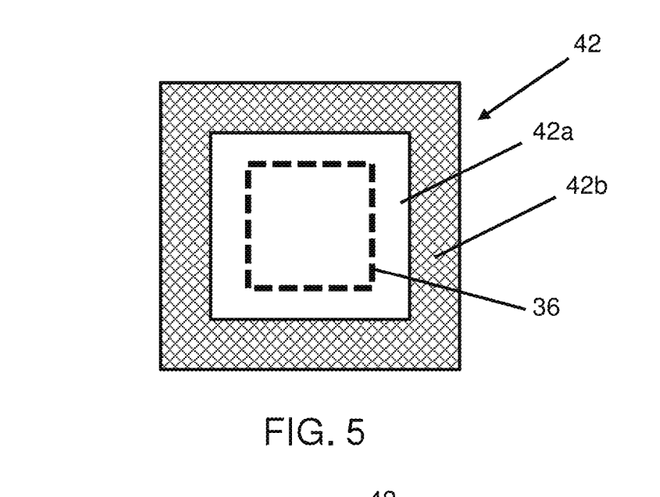
FIG. 5 is a pictorial view of an example of a shielding component for a shielding article.
Figure 6:
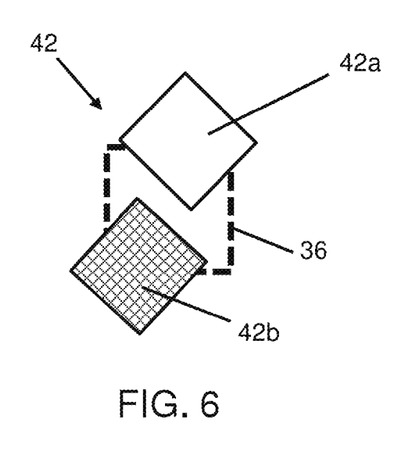
FIG. 6 is a pictorial view of an example of a shielding component for a shielding article.
Figure 7:
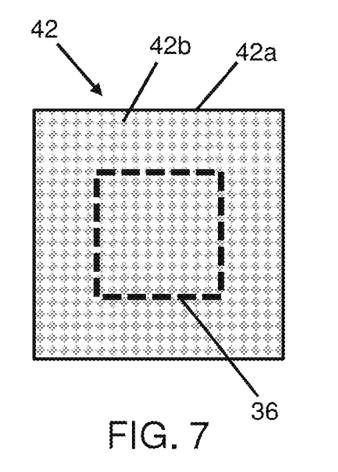
FIG. 7 is a pictorial view of an example of a shielding component for a shielding article.
Figure 8:
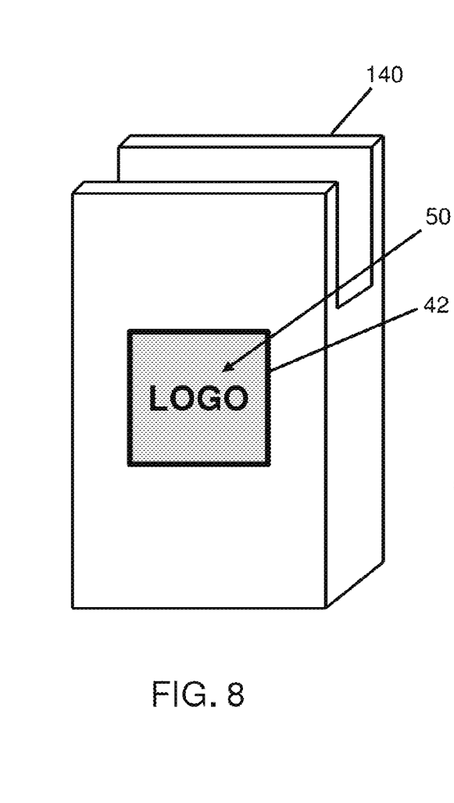
FIG. 8 is a perspective view of a mobile device accessory having an externally attached shielding component.

The shielding component 42 may take various forms and may include any suitable number of sub-components or portions. For example, the shielding component 42 may include a solid component, a mesh, or a combination of a solid and a mesh. FIG. 4 illustrates a shielding component 42 having a single solid portion, and FIG. 5 illustrates an example of a shielding component 42 that includes a solid portion 42a surrounded by, or mounted on, a mesh portion 42b. FIG. 6 illustrates a variation wherein the shielding component 42 includes a solid portion 42a and a mesh portion 42b positioned to obstruct different portions of the underlying NFC antenna 36. Another example is shown in FIG. 7, wherein a mesh portion 42a of the shielding component 42 includes solid portions 42b provided by filling in gaps in the mesh.

The form taken by the shielding component 42 may depend on the location of other antennae on the NFC-enabled device 10, 14, 30. For example, a mesh of the lining may be chosen to have metal filling in a middle portion and dielectric filling on the edges to reduce the electrical effects on those antennae. Variations other than a solid lining may also be chosen for reasons of cost efficiencies. For example, a mesh material may be used to reduce costs and weight. Also, where the shielding component 42 is located and how visible it is may also dictate the nature of the shielding component 42, e.g., for aesthetic reasons.

The shielding component 42 may be comprised of any material capable of fully or at least partially blocking, absorbing, obstructing, diffracting, attenuating, disrupting, scrambling, or otherwise "shielding" the NFC antenna 36 from outside influences that would cause an NFC transaction to take place. For example a metal such as an aluminum or copper foil or mesh may be used, a lossy dielectric, an absorbent material, or any combination of these types of materials made be used. Examples of lossy/absorbent materials include, without limitation:

- A polymeric material filled with magnetic particles providing a magnetic absorber. Such materials are known to have both high permeability (magnetic loss properties) and high permittivity (dielectric loss properties).
- A permeable material using magnetic fillers, e.g., high permeability Q-Zorb HP™ materials, which use magnetic fillers to achieve high permeability.
- A foam absorber impregnated with a carbon coating, e.g., similar to materials used in chamber absorbers.

By configuring the shielding article 40 to be used with a particular NFC-enabled device 10, 14, 30, the shielding article 40 only requires enough of the material for the shielding component 42 to cover or substantially obstruct the NFC antenna 36. For mobile devices 30 such as that shown in FIG. 4, only one side of the shielding article 40 would typically require the shielding component material if components between the NFC antenna 36 and the opposing side of the mobile device 30 would otherwise block NFC communications. For example, a mobile device 30 stowed in a holster against the body of a user with the NFC antenna 36 facing outwards would require shielding, whereas the same device flipped around such that the display screen 32 faces outwardly would not require the shielding. However, an accessory such as a sleeve or other protector that is not necessarily "holstered" may enable different modes based on which orientation the NFC-enabled device is stowed and where the shielding component 42 is located.

In order to provide a countermeasure to attacks such as relay attacks when the device is off, the shielding component 42 should therefore be just "sufficient" to shield the NFC antenna 36 of the accompanying NFC-enabled device 10, 14, 30 from being activated by an NFC reader 12, 16. The sufficiency of the shielding provided can be determined based on the choice of material (e.g., metal, lossy dielectric, absorber, combination thereof), the texture of the shielding (e.g., smooth versus rough), the continuity of the shielding (e.g. a continuous sheet or a mesh or a combination thereof), the placement of the shielding portion(s) and the number of shielding portions (e.g. one or more centrally positioned portions—FIGS. 4 and 5, or smaller distributed portions around the NFC antenna's location—FIG. 6).

The positioning of the shielding component 42 in or on the shielding article 40 is made such that the shielding component 42 is aligned with the NFC antenna 36 when the shielding article 40 is coupled to the NFC-enabled device 10, 14, 30. In this way, NFC communications can be disabled by stowing the NFC-enabled device 10, 14, 30 or by coupling the shielding article 40 in a way that aligns the shielding component 42 and the NFC antenna 36. For example, a holster, sleeve, protector, or pocket, may include the shielding component 42 positioned such that a mobile device 30, when stowed, has the NFC antenna 36 aligned with the shielding component 42. A holster, sleeve, or the NFC-enabled device itself may also be fitted with a detachably removable portion such as a collar or annular sleeve that can slide into a position that blocks the NFC antenna 36 but can be rotated or slid out of alignment.

Figure 9:
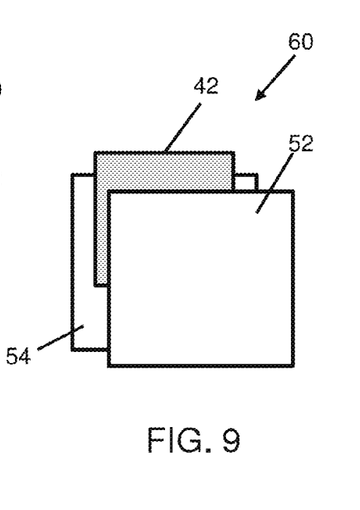
FIG. 9 is a partial exploded view of a mobile device accessory having an embedded lining for providing a shielding component.
Figure 10:
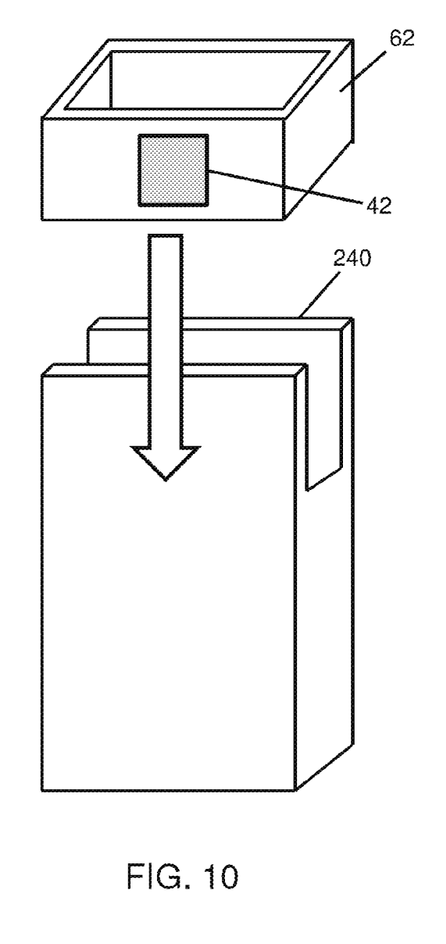
FIG. 10 is a perspective view of a shielding article sized to be coupled with a mobile device accessory to adapt the accessory to include the shielding component.

Various example configurations for the shielding article 40 will now be described, making reference to FIGS. 8 to 15. In the example shown in FIG. 8, a logo 50, patch, or other article is affixed to the exterior of a first carrying accessory 140 (e.g., holster, sleeve, pocket, protector, etc.). In this way, an existing shielding article 40 can be retrofitted with a shielding component 42. FIG. 9 illustrates an exploded view of a portion of a lined accessory 60, which includes the shielding component 42 interposed between layers 52, 54 of the accessory 60. FIG. 10 illustrates a second carrying accessory 240, which itself does not contain the shielding component 42 but can be adapted to provide shielding by having a collar 62 fitted over and around the carrying accessory 60 like a sleeve. In the example shown in FIG. 10, the collar 62 can be slid over the second carrying accessory 240 until the shielding component 42 is positioned substantially where the NFC antenna 36 would be positioned when the mobile device 30 is stowed. It can be appreciated that one or more of the collar 62 and the second carrying accessory 240 can be configured to assist with positioning the collar 62 on the second carrying accessory 240, e.g., a marking, protrusion, contour, ridge, etc.

Figure 11:
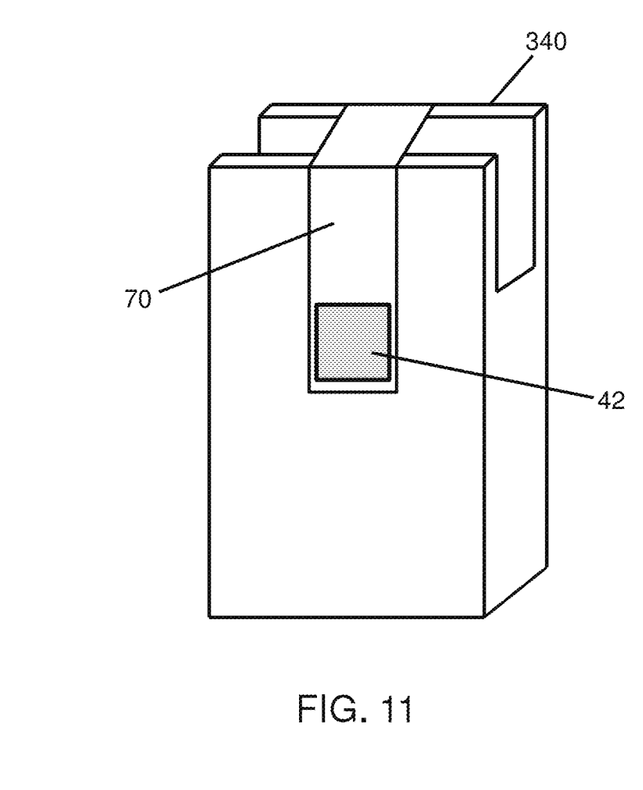
FIG. 11 is a perspective view of a mobile device accessory having a movable shielding article and illustrating an NFC-inoperable state.
Figure 12:
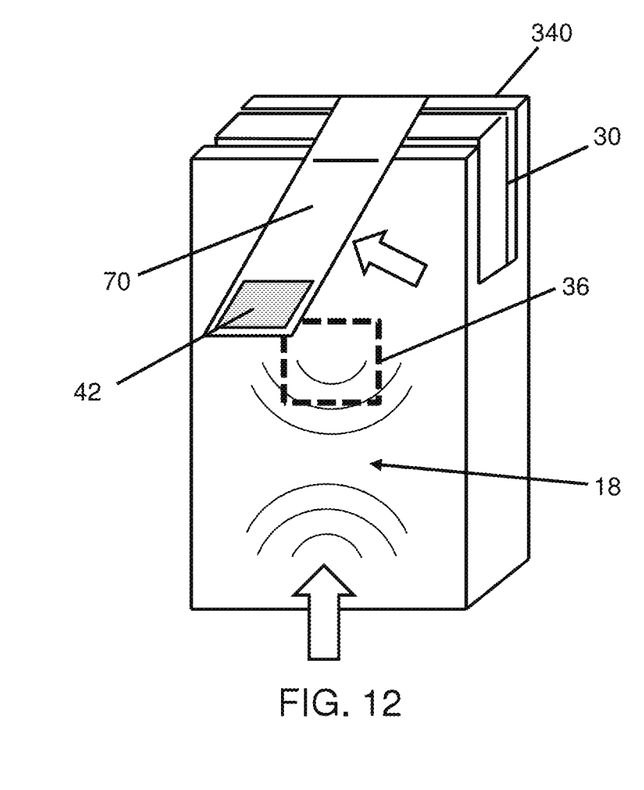
FIG. 12 is a perspective view of a mobile device accessory having a movable shielding article and illustrating an NFC-operable state.

FIGS. 11 and 12 illustrate another example wherein the shielding component 42 can be made movable between NFC operable and NFC inoperable positions, modes, or states. A third carrying accessory 340 is shown, which includes a closure 70 used to, for example, facilitate stowage of a mobile device 30. The shielding component 42 is included in the closure 70 as shown in FIG. 11, such that when the closure 70 is in a closed position, the shielding component 42 is aligned with the region of the third carrying accessory 340 where the NFC antenna 36 will be when the mobile device 30 is stowed (NFC inoperable mode). By including the shielding component 42 in the closure 70, an NFC operable mode can be provided as shown in FIG. 12 wherein lifting or otherwise moving the closure 70 away from the third carrying accessory 340 removes the shielding from the underlying NFC antenna 36 thus allowing NFC communications 18 in this mode. In this way, the user may stow the mobile device 30 and be protected but have the ability to conduct an NFC transaction by lifting the closure 70 and tapping, touching, or bringing an NFC reader 12, 16 in proximity to the third carrying accessory 340. This may be done without removing the mobile device 30 from the third carrying accessory 340 providing a convenient way to both provide attack countermeasures and permit NFC transactions through a deliberate action. Moreover, by providing only enough shielding material to cover the NFC antenna 36, other antennae used by the mobile device 30 may still be operational while the NFC countermeasures are in place.

Figure 13:
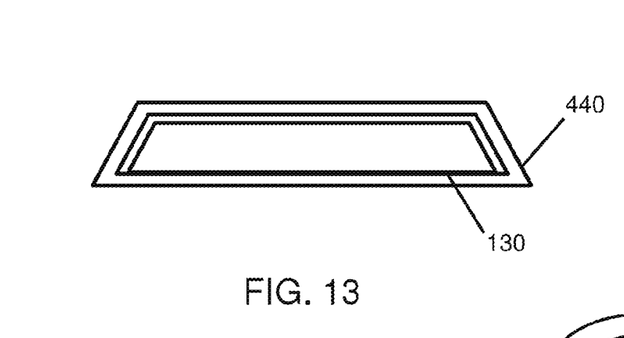
FIG. 13 is a plan view of a mobile device and accessory contoured to restrict insertion of the mobile device into the accessory to a particular orientation.

FIG. 13 illustrates a fourth carrying accessory 440 that is configured to restrict the orientations that a mobile device 130 may be stowed. In the example shown in FIG. 13, the mobile device 130 and the fourth carrying accessory 440 are complementarily contoured such that a particular surface of the mobile device 130 (e.g., the rear surface 34 shown in FIG. 3) faces only a single direction, regardless of whether the mobile device 130 is stowed in an upright or upside down orientation. Such contouring allows the shielding article 40 to force the NFC-enabled device 10, 14, 30 to utilize the NFC shielding. For example, a sleeve that is not held against a user's body could be susceptible to an attack if the NFC antenna 36 is not facing the shielding component 42. By restricting the way in which the device and shielding article 40 are coupled, the countermeasures are ensured whenever the device is stowed. In another example, a pocket of a garment of clothing or a bag/purse could be tapped or touched by a reader 12, 16 from either side (e.g., if the bag/purse is left open—see FIG. 15) and thus enforcing the orientation wherein the NFC antenna 36 is aligned on the same side as the shielding component 42 may be desirable.

Figure 14:
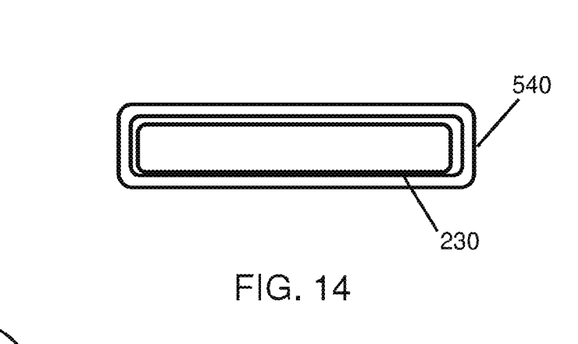
FIG. 14 is a plan view of a mobile device and accessory contoured to allow multiple insertion orientations.

FIG. 14 illustrates a fifth carrying accessory 540 which permits multiple orientations. Such a configuration may be desirable if a user wishes to use the accessory 540 with NFC enabled but the shielding component 42 is not removable (FIG. 10) or moveable. It can be appreciated that enabling multiple orientations (e.g., backwards and forwards) as shown in FIG. 14 allows for multiple modes according to how the user stows the mobile device 230:

ALL OFF—where the shielding component 42 and NFC antenna 36 are aligned and the mobile device 130, 230 is powered off;

ONLY NFC OFF—where the shielding component 42 and NFC antenna 36 are aligned and the mobile device 130, 230 is powered on thus allowing other antennae to be used; and ALL ON—where the mobile device 130 is "flipped around" such that the shielding component 42 and NFC antenna 36 are out of alignment.

Figure 15:
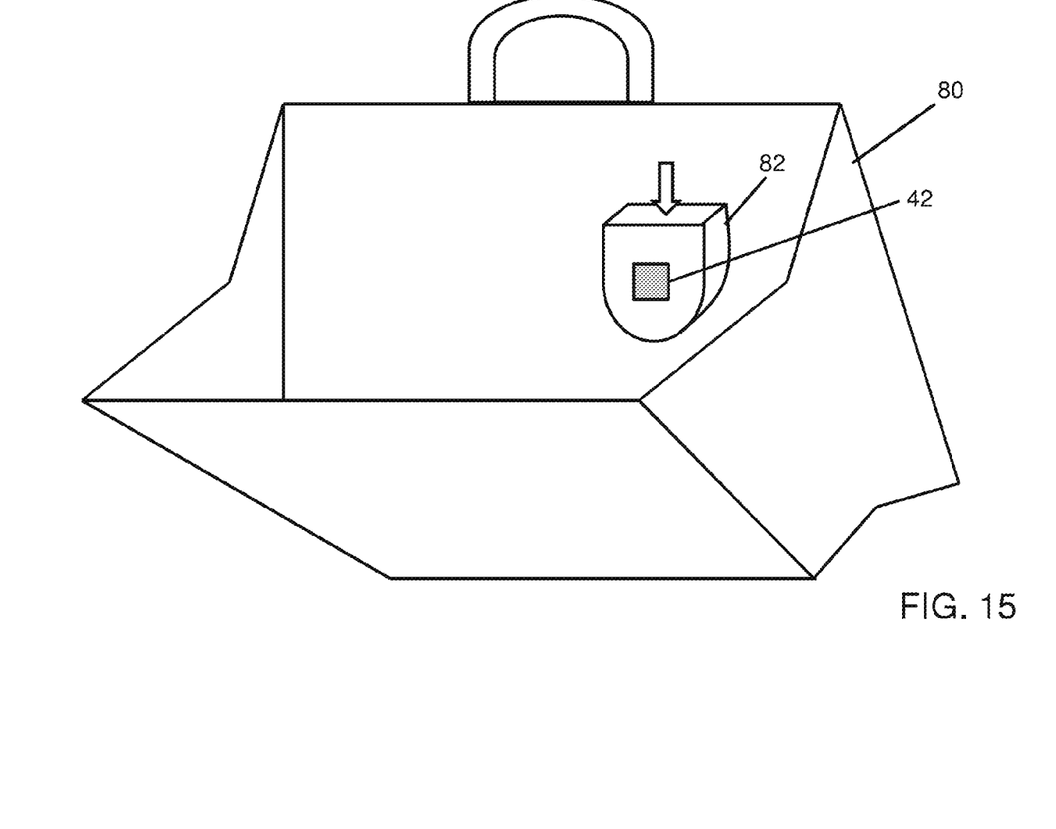
FIG. 15 is a perspective view of a mobile device accessory with a shielding article, which is coupled to another article.

FIG. 15 illustrates another article 80, in this example resembling a bag, purse or piece of luggage. In the example shown in FIG. 15, the other article 80 includes a shielding article 82 such as a pouch or pocket that includes the shielding component 42. It can be appreciated that the shielding article 82 in this example may be detachably coupled to the other article 80 or may be integrated into the article 80 itself (e.g., a custom pocket designed into the article 80).

Accordingly, there is provided a shielding article for shielding a device enabled for proximity-based communications, the shielding article comprising a shielding component configured to prevent operation of an antenna of the device used for conducting proximity-based communications, without preventing operation of at least one other antenna of the device when the shielding component is aligned with the antenna used for conducting proximity-based communications.

There is also provided an accessory for a device enabled for proximity-based communications, the accessory comprising a shielding article for shielding the device, the shielding article comprising a shielding component configured to prevent operation of an antenna of the device used for conducting proximity-based communications, without preventing operation of at least one other antenna of the device when the shielding component is aligned with the antenna used for conducting proximity-based communications.

There is also provided a carrying article comprising a shielding article for shielding a device enabled for proximity-based communications, the shielding article comprising a shielding component configured to prevent operation of an antenna of the device used for conducting proximity-based communications, without preventing operation of at least one other antenna of the device when the shielding component is aligned with the antenna used for conducting proximity-based communications.

Although the above principles have been described with reference to certain specific examples, various modifications thereof will be apparent to those skilled in the art as outlined in the appended claims.

The invention claimed is:

1. A shielding article for shielding a device enabled for proximity-based communications, the shielding article comprising a shielding component configured to prevent operation of an antenna of the device used for conducting proximity-based communications, without preventing operation of at least one other antenna of the device when the shielding component is aligned with the antenna used for conducting proximity-based communications.

2. The shielding article of claim 1, wherein the shielding article is configured to be coupled to the device to enable alignment of the shielding component and the antenna used for conducting proximity-based communications.

3. The shielding article of claim 2, wherein the shielding component is movable with respect to the device to enable a first coupled position wherein the shielding component is aligned with the antenna used for conducting proximity-based communications, and a second coupled position wherein the shielding component is unaligned with the antenna used for conducting proximity-based communications to permit proximity-based communications with the device.

4. The shielding article of claim 3, wherein the shielding article is affixed to an accessory for the device.

5. The shielding article of claim 4, wherein a closure for the accessory comprises the shielding article.

6. The shielding article of claim 3, wherein the shielding article is detachably coupled to the device or an accessory for the device.

7. The shielding article of claim 6, wherein a collar sized to slide over the device or the accessory comprises the shielding article.

8. The shielding article of claim 1, wherein the shielding article is affixed to an exterior surface of an accessory for the enabled device such that the shielding component is aligned with the antenna used for conducting proximity-based communications when the device is stowed in the accessory.

9. The shielding article of claim 1, wherein the shielding article is located within an accessory for the device.

10. The shielding article of claim 9, wherein the accessory is contoured to restrict stowage of the device such that a first exterior surface of the device faces a particular direction.

11. The shielding article of claim 10, wherein the first exterior surface comprises a display screen.

12. The shielding article of claim 10, wherein the accessory is contoured to permit stowage of the enabled device such that a first exterior surface of the device can face multiple directions.

13. The shielding article of claim 1, wherein the shielding article is located within another article.

14. The shielding article of claim 1, wherein the shielding component comprises any one or more of a solid portion and a mesh portion.

15. The shielding article of claim 14, wherein the shielding component comprises a plurality of solid portions distributed within the mesh portion.

16. The shielding article of claim 1, wherein the shielding component comprises a plurality of portions, each portion configured to shield a portion of the antenna used for conducting proximity-based communications.

17. The shielding article of claim 1, wherein the shielding component comprises any one or more of a lossy material and an absorbent material.

18. The shielding article of claim 17, wherein the shielding component comprises of any one or more of a polymeric material filled with magnetic particles, a permeable material using magnetic fillers, and foam absorbers impregnated with a carbon coating.

19. The shielding article of claim 1, wherein the antenna used for conducting proximity-based communications is a near field communication (NFC) antenna and the device is enabled for conducting NFC-based communications.

20. An accessory for a device enabled for proximity-based communications, the accessory comprising a shielding article for shielding the device, the shielding article comprising a shielding component configured to prevent operation of an antenna of the device used for conducting proximity-based communications, without preventing operation of at least one other antenna of the device when the shielding component is aligned with the antenna used for conducting proximity-based communications.

21. A carrying article comprising a shielding article for shielding a device enabled for proximity-based communications, the shielding article comprising a shielding component configured to prevent operation of an antenna of the device used for conducting proximity-based communications, without preventing operation of at least one other antenna of the device when the shielding component is aligned with the antenna used for conducting proximity-based communications.

22. The carrying article of claim 21, wherein the shielding article is incorporated into an accessory of the carrying article.

23. The carrying article of claim 22, wherein the accessory is detachably coupled to the carrying article.

24. The carrying article of claim 22, wherein the accessory is integral to the carrying article.

* * * * *